United States Patent
Azuma et al.

(10) Patent No.: US 11,590,393 B2
(45) Date of Patent: Feb. 28, 2023

(54) ANIMATION PREPARING DEVICE, ANIMATION PREPARING METHOD AND RECORDING MEDIUM

(71) Applicant: CASIO COMPUTER CO., LTD., Tokyo (JP)

(72) Inventors: Yunosuke Azuma, Fussa (JP); Masaaki Sasaki, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 59 days.

(21) Appl. No.: 17/202,535

(22) Filed: Mar. 16, 2021

(65) Prior Publication Data

US 2021/0299519 A1 Sep. 30, 2021

(30) Foreign Application Priority Data

Mar. 24, 2020 (JP) .............................. JP2020-053112

(51) Int. Cl.
| | |
|---|---|
| *A63B 24/00* | (2006.01) |
| *G06T 13/80* | (2011.01) |
| *G06T 13/40* | (2011.01) |

(52) U.S. Cl.
CPC ...... *A63B 24/0087* (2013.01); *A63B 24/0062* (2013.01); *G06T 13/40* (2013.01); *G06T 13/80* (2013.01); *A63B 2024/0096* (2013.01)

(58) Field of Classification Search
CPC ............ A63B 24/0087; A63B 24/0062; A63B 2024/0096; G06T 13/40; G06T 13/80
See application file for complete search history.

(56) References Cited

U.S. PATENT DOCUMENTS 9,697,417 B2 * 7/2017 Aonuma ................ G06V 40/23

FOREIGN PATENT DOCUMENTS

JP 2015146980 A 8/2015

OTHER PUBLICATIONS

Hirth, Christopher J. "Clinical movement analysis to identify muscle imbalances and guide exercise." International Journal of Athletic Therapy and Training 12.4 (2007): 10-14 (Year: 2007).*

* cited by examiner

*Primary Examiner* — Xin Sheng
(74) *Attorney, Agent, or Firm* — Holtz, Holtz & Volek PC

(57) ABSTRACT

The animation preparing device includes at least one processor. The processor acquires exercise data concerning an exercise done by a user or the exercise that the user is doing. In a case where there exists a plurality of causes for a characteristic point of the user that has been detected based on the acquired exercise data, the processor prepares, from the exercise data, a first user animation represented in a first direction of line of sight as an animation of the exercise done by the user or the exercise that the user is doing in order to indicate a first cause for the characteristic point, and prepares a second user animation represented in a second direction of line of sight that is separate from the first line of sight in order to indicate a second cause for the characteristic point that is separate from the first cause.

14 Claims, 8 Drawing Sheets

ANIMATION PREPARING DEVICE, ANIMATION PREPARING METHOD AND RECORDING MEDIUM

CROSS-REFERENCE TO RELATED APPLICATION

This application claims the benefit of Japanese Patent Application No. 2020-053112, filed Mar. 24, 2020, the entire disclosure of which is incorporated by reference herein.

FIELD

The present disclosure relates to an animation preparing device, an animation preparing method, and a recording medium.

BACKGROUND

As a system for representing a state of exercising by way of animation, there is disclosed, for example in the Unexamined Japanese Patent Application Publication No. 2015-146980, an exercise support system that compares an animation reproducing the form of a user and a model animation and presents the comparison result while emphasizing a body part that is dissimilar to the model.

The exercise support system disclosed in the literature supports an exercise by emphasizing a body part that is dissimilar to a model. This approach has a problem that a user actually has no idea about an improvement method when just recognizing the body part in question. For example, just knowing the fact that "the strides in running are smaller than those of a model" does not provide the user with a corresponding practical correction method (how to increase strides). A body part that a user has to keep in mind when wishing to increase strides may be not only a body part that is dissimilar to a model but also a body part to which the user must pay attention in order to correct the dissimilarity.

SUMMARY

An objective of the present disclosure in one aspect is to provide a technique capable of clearly presenting an improvement point or the like in an exercise.

An animation preparing device according to the present disclosure includes at least one processor. The processor acquires exercise data concerning an exercise done by a user or the exercise that the user is doing. In a case where there exists a plurality of causes for a characteristic point of the user in the exercise that has been detected based on the acquired exercise data, the processor prepares, from the exercise data, a first user animation represented in a first direction of line of sight as an animation of the exercise done by the user or the exercise that the user is doing in order to indicate a first cause for the characteristic point, and prepares, from the exercise data, a second user animation that is separate from the first user animation represented in the first direction of line of sight, the second user animation being represented in a second direction of line of sight as an animation of the exercise done by the user or the exercise that the user is doing, in order to indicate a second cause for the characteristic point that is separate from the first cause.

According to the present disclosure, it is possible to clearly present an improvement point or the like in an exercise.

Further features of the present invention will become apparent from the following description of exemplary embodiments (with reference to the attached drawings).

BRIEF DESCRIPTION OF THE DRAWINGS

A more complete understanding of this application can be obtained when the following detailed description is considered in conjunction with the following drawings, in which.

DETAILED DESCRIPTION

Embodiments of the present disclosure will be detailed below with reference to drawings.

Embodiment 1

Figure 1:
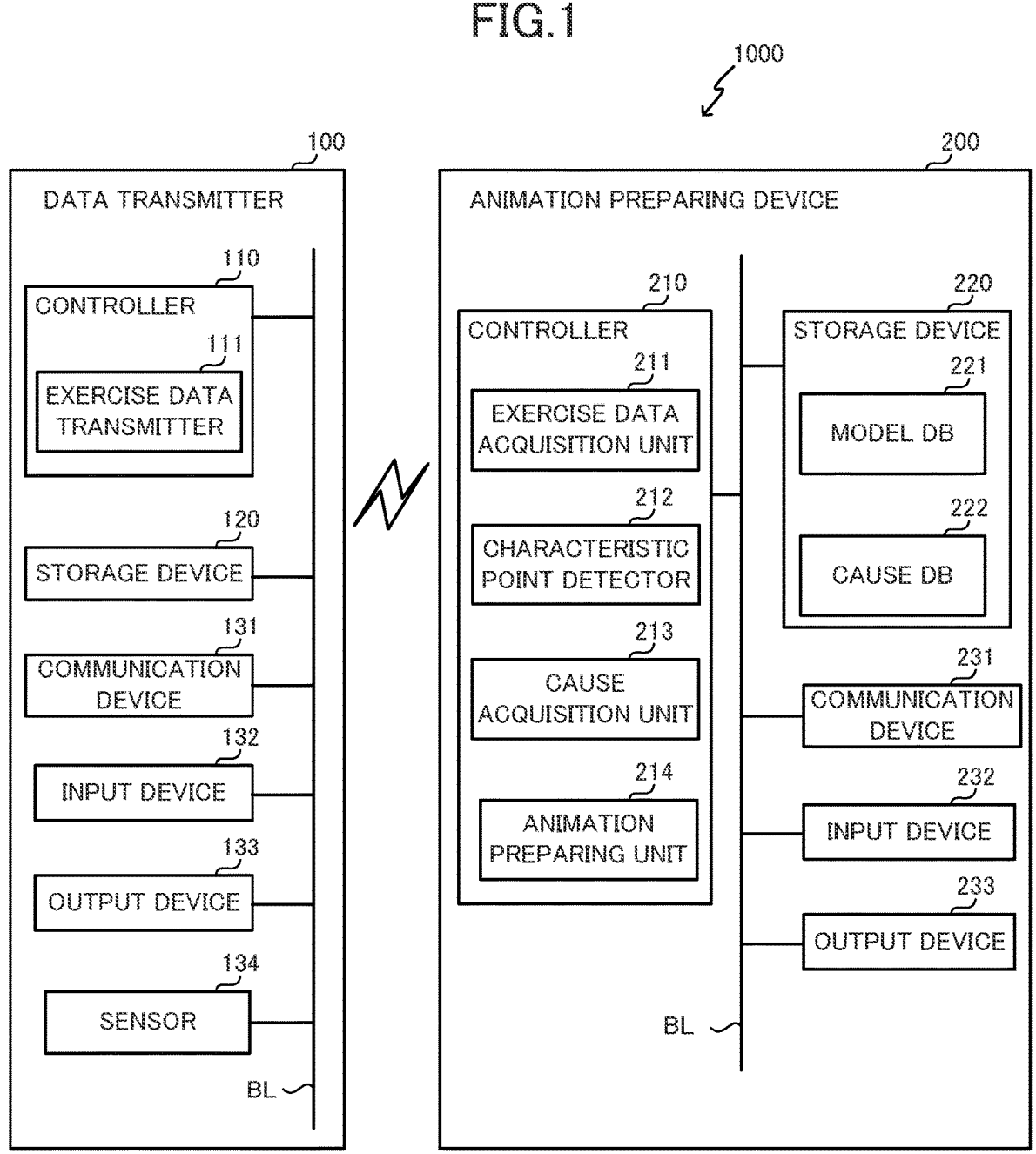
FIG. 1 illustrates a configuration example of an animation preparing system according to Embodiment 1.

An animation preparing system 1000 according to Embodiment 1 of the present disclosure is a system for preparing an animation representing a user's motion (such as an exercise form). The animation preparing system 1000 includes, as illustrated in FIG. 1, a data transmitter 100 and an animation preparing device 200.

The data transmitter 100 is, for example, a small-sized wearable device to be worn near a waist along the core of the user's body. The data transmitter 100 includes, as illustrated in FIG. 1, a controller 110, a storage device 120, a communication device 131, an input device 132, an output device 133, and a sensor 134. The data transmitter 100 transmits to the animation preparing device 200, via the communication device 131, data indicating the user's body motion detected by the sensor 134.

The controller 110 includes a central processing unit (CPU). The controller 110 functions as an exercise data transmitter 111 described later, by executing a program stored on the storage device 120.

The storage device 120 includes a read-only memory (ROM), a random access memory (RAM) and a flash memory, and stores a program to be executed by the CPU of the controller 110 and necessary data. Note that data that is wished to be saved even after the data transmitter 100 is powered OFF will be saved in a nonvolatile memory such as a flash memory.

The communication device 131 includes a wireless communication module and an antenna, and wirelessly communicates data with the animation preparing device 200. The communication device 131 may use not only a wireless system but also a wired interface such as a universal serial bus (USB) in the data communications with the animation preparing device 200.

The input device 132 includes a pushbutton switch and accepts an input instruction from a user such as "Start measurement" or "Transmit data".

The output device 133 includes a light emitting diode (LED), a liquid crystal display panel and an organic electro-luminescence (EL) display panel, and displays information including the operation state (power ON, measurement under way, data transmission under way or the like) of the data transmitter 100. The output device 133 includes a voice output device such as a loudspeaker and outputs as voice information the information indicating the operation state of the data transmitter 100 and the like.

The sensor 134 includes an acceleration sensor, a gyro angular velocity sensor and a global positioning system (GPS) receiver, and detects a body motion, a current position and the like of a user wearing the data transmitter 100. The sensor 134 transmits to the controller 110 acceleration data detected by the acceleration sensor, angular velocity data detected by the gyro angular velocity sensor, as well as time data, position and the like detected by the GPS receiver (herein after these data will be collectively referred to as "exercise data"). Note that the data transmitter 100 may include a plurality of sensors 134 such as a sensor worn around a waist 134A, a sensor worn around a wrist 134B, and a sensor worn around an ankle 134C. The controller 110, the storage device 120, the communication device 131, the input device 132, the output device 133 and the sensor 134 are interconnected via a bus line BL.

Next, functions of the controller 110 will be described. The controller 110 functions as an exercise data transmitter 111 by executing a program stored on the storage device 120.

The exercise data transmitter 111 transmits, to the animation preparing device 200 via the communication device 131, exercise data detected by the sensor 134 (acceleration data, angular velocity data, time data, position data and the like indicating a user's motion). Further, the exercise data transmitter 111 may transmit, to the animation preparing device 200, as exercise data, travel distance data calculated from position data, speed data and acceleration data and the like calculated from time data and position data.

In the data transmitter 100, the sensor 134 may detect exercise data or the exercise data transmitter 111 may transmit exercise data to the animation preparing device 200 at any timing. For example, the data transmitter 100, upon receiving an instruction "Start measurement" from a user via the input device 132, may start detection of exercise data in the sensor 134, and upon receiving an instruction "Finish measurement" from the user via the input device 132, may finish detection of exercise data in the sensor 134. While the data transmitter 100 is powered ON, the sensor 134 may keep detecting exercise data, rather than receiving an input instruction from a user.

Concerning transmission of exercise data, in the data transmitter 100, for example, upon accepting an input instruction "Transmit data" from a user via the input device 132, the exercise data transmitter 111 may transmit exercise data to the animation preparing device 200 via the communication device 131. For example, upon receiving an exercise data transmission request packet transmitted from the animation preparing device 200, the exercise data transmitter 111 may transmit excise data to the animation preparing device 200 via the communication device 131.

Next, the animation preparing device 200 will be described. The animation preparing device 200 is, for example, a personal computer (PC), a tablet terminal, a smartphone or a smart watch. As illustrated in FIG. 1, the animation preparing device 200 includes a controller 210, a storage device 220, a communication device 231, an input device 232, and an output device 233. The animation preparing device 200 prepares an animation representing a body motion of a user and presents the resulting animation to the user, based on exercise data transmitted by the data transmitter 100.

The controller 210 includes a processor such as a CPU. The controller 210 functions as each section described later (an exercise data acquisition unit 211, a characteristic point detector 212, a cause acquisition unit 213 or an animation preparing unit 214), by executing a program stored on a storage device 220.

The storage device 220 includes a ROM, a RAM, a flash memory and the like, and stores a program executed by the CPU of the controller 210 and necessary data. Note that data that is wished to be saved even after the animation preparing device 200 is powered OFF will be saved in a nonvolatile memory such as a flash memory. The storage device 220 stores a model database (DB) 221 and a cause DB 222.

The model DB 221 is a database storing a large collection of exercise data (model data) used as a model of correct forms of a variety of exercises (running, a swing in baseball, tennis, golf or the like, a kick in soccer, a punch in boxing and the like). Each piece of model data stored in the model DB 221 includes exercise data acquired from a coach of each exercise in advance (for example, by asking the coach to wear the data transmitter 100 and practice running or the like). To generate each piece of model data to be stored in the model DB 221, it is not always necessary to ask a coach or the like to practice running or the like; instead, model data that is artificially prepared based on a value that may be used scientifically as a model, or exercise data obtained by analyzing a large collection of exercise data acquired from athletes and so on, may be employed as model data.

The cause DB 222 is a database storing a large collection of data of a cause (cause data) for a characteristic point (a weak point or a strong point) of an exercise of a user (such as a form in exercise). Each piece of cause data stored in the cause DB 222 includes exercise data acquired from a coach of each exercise in advance (for example, based on a detailed coaching on each characteristic point by the coach) or information on a cause for each characteristic point obtained by analyzing exercise data. To generate each piece of cause data to be stored in the cause DB 222, it is not always necessary to ask a coach or the like to give detailed coaching; instead, such cause data may be artificially prepared based on a scientifically possible cause for a characteristic point. The controller 210 may acquire a cause for a particular characteristic point on the exercise basis or on the characteristic point basis, by referencing the cause DB 222.

The communication device 231 includes a wireless communication module and an antenna, and wirelessly communicates data with the data transmitter 100. The communication device 231 may use not only a wireless system but also a wired interface such as a USB in the data communications with the data transmitter 100.

The input device 232 includes a switch, a touch panel, a keyboard and a mouse, and accepts an input instruction from a user such as "Prepare animation".

The output device 233 includes a liquid crystal display panel and an organic electro-luminescence (EL) display panel, and functions as a display for presenting, for example, an animation prepared by animation preparing processing described later. That is, the display includes a liquid crystal display panel and an organic electro-luminescence (EL) display panel, and is configured to display, for example, an animation prepared by animation preparing processing described later. The output device 233 includes a voice output device such as a loudspeaker, and outputs voice concerning an animation prepared by animation preparing processing.

The controller 210, the storage device 220, the communication device 231, the input device 232 and the output device 233 are interconnected via the bus line BL.

Next, a function of the controller 210 will be described. The controller 210 functions as an exercise data acquisition unit 211, a characteristic point detector 212, a cause acquisition unit 213, or an animation preparing unit 214 by executing a program stored on the storage device 220.

The exercise data acquisition unit 211 acquires, from the data transmitter 100 via the communication device 231, exercise data indicating a user's motion (acceleration data, angular velocity data, time data, position data, travel distance data, speed data and the like). This allows the exercise data acquisition unit 211 to acquire exercise data concerning an exercise done by the user or the exercise that the user is doing.

The characteristic point detector 212 uses exercise data acquired by the exercise data acquisition unit 211 based on a user's exercise and model data stored in the model DB 221 to detect a characteristic point of the user in the exercise (a weak point or a strong point). For example, the characteristic point detector 212 calculates a ratio of strides (strides in running) to the speed from exercise data and model data respectively and compares the resulting ratios with each other to detect a user's characteristic point such as "the strides are too short for user's running speed".

To be specific, the characteristic point detector 212 uses a value calculated from exercise data and a value calculated from model data to calculate a score of a particular point of view among various points of view (a length of strides, a size of arm swing, a volume of left and right shaking of body, a volume of vertical motion of body and the like). For example, in a case where both values are equal to each other, the score value is 100. The larger the difference between the values is, the score value decreases. In a case where the calculated score is less than a predetermined threshold (60 for example), the characteristic point detector 212 detects a value calculated from exercise data as a user's characteristic point in the point of view.

The cause acquisition unit 213 references the cause DB 222 to acquire a cause for a characteristic point (cause data) detected by the characteristic point detector 212. For example, the cause acquisition unit 213 acquires, concerning a characteristic point "the strides are too short for a target speed", a cause data such as "horizontal waist rotation is small" or "pivot foot is imbalanced" as a cause for the characteristic point.

The animation preparing unit 214 prepares an animation (user animation) of the exercise done by the user or the exercise that the user is doing from user's exercise data. In this process, the animation preparing unit 214 prepares, based on the cause data acquired by the cause acquisition unit 213, a user animation that will clearly present a corresponding cause to a user. For example, concerning a cause data "horizontal waist rotation is small", the animation preparing unit 214 prepares an animation in a direction of line of sight from right above that will help easily understand a motion of waist rotation so as to make it easier to see the motion of horizontal waist rotation. The animation preparing unit 214 prepares an animation serving as a model for an exercise (model animation) from model data stored in the model DB 221.

Figure 2:
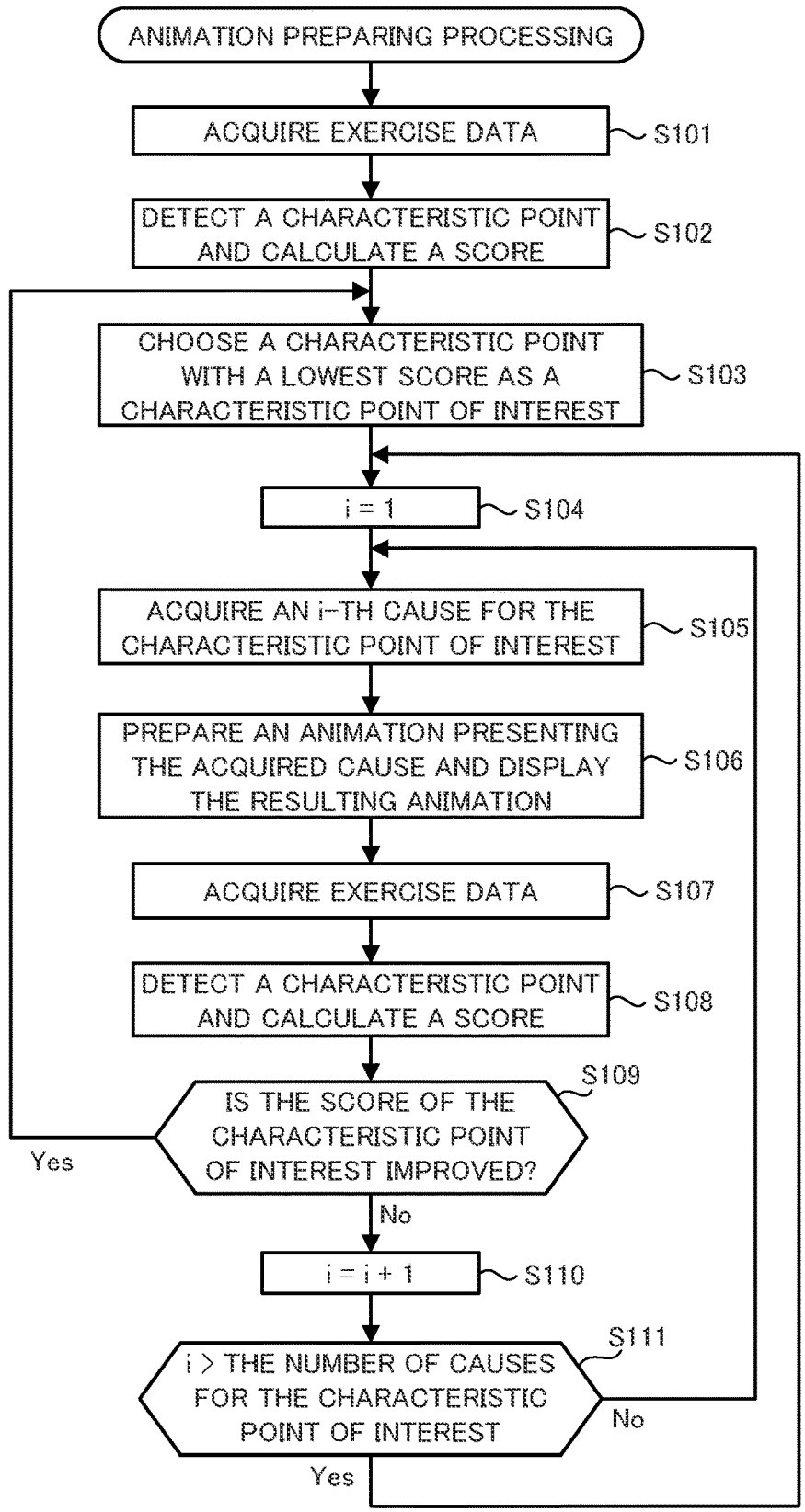
FIG. 2 is a flowchart of animation preparing processing according to Embodiment 1.

Next, animation preparing processing executed by the animation preparing device 200 will be described with reference to FIG. 2. This processing starts when a user inputs an instruction "Prepare animation" via the input device 232. This is a prerequisite that a user has done an exercise or is currently doing an exercise with the data transmitter 100 worn and accordingly the data transmitter 100 is ready to transmit exercise data.

First, the exercise data acquisition unit 211 acquires exercise data from the data transmitter 100 via the communication device 231 (step S101). For example, when the animation preparing device 200 transmits an exercise data transmission request packet to the data transmitter 100, exercise data is transmitted from the data transmitter 100. The exercise data acquisition unit 211 receives and thus acquires the exercise data. The exercise data acquired here is related to the exercise done by the user or the exercise that the user is doing. Step S101 is also called an exercise data acquisition step. In a case where the exercise data acquisition unit 211 has already acquired exercise data, for example because the data transmitter 100 is transmitting exercise data to the animation preparing device 200 on a regular basis, step S101 may be skipped.

Next, the characteristic point detector 212 uses exercise data acquired by the exercise data acquisition unit 211 and model data stored in the model DB 221 to detect a characteristic point of the exercise by the user and calculates a score of the characteristic point (step S102). In particular, the characteristic point detector 212 uses exercise data and model data to calculate a score of a particular point of view among various points of view (a length of strides, a size of arm swing, a volume of left and right shaking of body, a volume of vertical motion of body and the like). In a case where the calculated score is less than a predetermined threshold, the characteristic point detector 212 detects a value calculated from exercise data as a user's characteristic point in the point of view and determines the score as the score of the characteristic point.

Depending on a score value in a point of view, the characteristic point detector 212 may detect a plurality of characteristic points or no characteristic points. While not illustrated in FIG. 2, in a case where the characteristic point detector 212 has detected no characteristic points in step S102, the controller 210 may display a message such as "Your exercise form is acceptable." on the output device 233 and finish the animation preparing processing. In a case where no characteristic points have been detected, the characteristic point detector 212 may detect a value calculated from exercise data as a user's characteristic point in a point of view where a lowest score is obtained, and proceed to the subsequent processing.

The characteristic point detector 212 chooses a characteristic point with a lowest score as a characteristic point of interest (step S103). Next, the controller 210 initializes a variable i to count the number of causes to 1 (step S104). The cause acquisition unit 213 acquires an i-th cause from among the causes for the characteristic point of interest (step S105).

Next, the animation preparing unit 214 prepares an animation viewed in a direction of line of sight where the cause detected by the cause acquisition unit 213 (the i-th cause) in order to clearly indicate the cause and displays the animation on the output device 233 (step S106). Animation preparing processing in step S106 is also called a preparing step.

Figure 3A:
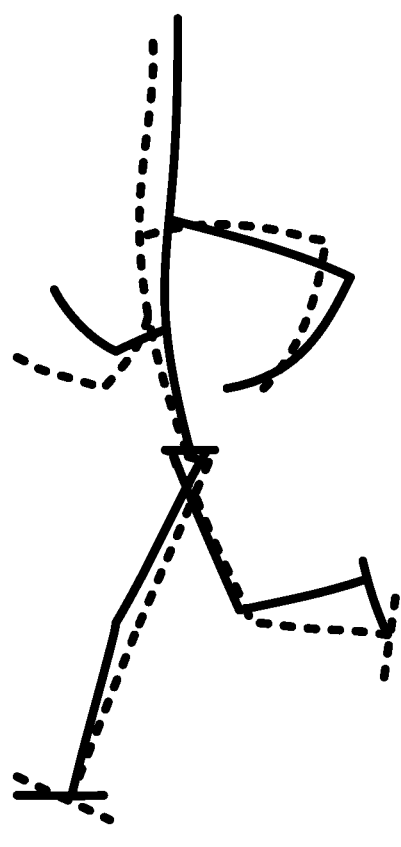
FIG. 3A explains an example of a user's form and a model form.
Figure 3A:

The animation to be displayed here will be additionally described. For example, FIG. 3A illustrates, in solid lines, an example of a user's form obtained from exercise data acquired by the exercise data acquisition unit 211 and, in dotted lines, an example of a model form obtained from model data. For example, in a case where a first cause acquired by the cause acquisition unit 213 concerning a characteristic point of interest "the strides are too short for a target speed" detected by the characteristic point detector 212 is "horizontal waist rotation is small", the animation preparing unit 214 prepares a user animation (a first user animation) of waist rotation in solid lines viewed from right above (in a first direction of line of sight) and a model animation thereof in dotted lines, both illustrated in FIG. 3B, and displays the resulting animations on the output device 233.

Figure 3B:
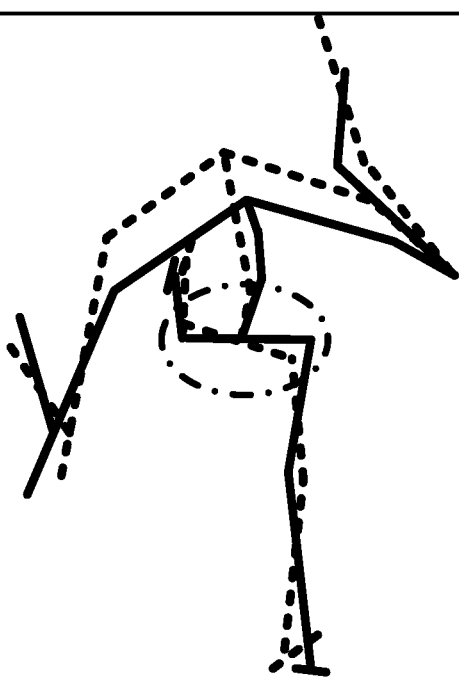
FIG. 3B explains an example of an animation of waist rotation viewed from right above.

While FIG. 3B illustrates a user animation and a model animation respectively in solid lines and dotted lines, this presentation is one example. The animation preparing unit 214 may display a user animation and a model animation in any discriminating form, for example, in a different color (such as in blue and red) or in a different display mode (such as a wire frame model and a surface model).

It may be displayed clearly for easy understanding of a user that horizontal rotation is small, by presenting a related animation represented in a direction of line of sight from right above. Moreover, FIG. 3B encloses a waist part with an ellipse in dashed lines for a user to easily pay attention to waist rotation. In this way, it is possible to give emphasized presentation to specify a user's body part that a user has to focus on, and communicate a cause for a characteristic point to the user in a simpler way. Such a display method is not limited to an emphasized presentation. The animation preparing unit 214 may prepare an animation where a motion of the body part on the basis of user's exercise data differs from a motion of the body part on the basis of model data so as to emphasize the difference therebetween.

In the present embodiment, it is assumed that, after an animation is presented in step S106, a user will do an exercise again with reference to the animation that has been presented. While not illustrated in FIG. 2, for example, after an animation is presented in step S106, the controller 210 may wait for a certain period time (three minutes, for example) and then proceed to S107 and the subsequent processing. After a user has done an exercise again, the controller 210 may input an instruction such as "Acquire exercise data" from the input device 232 and then proceed to S107 and the subsequent processing.

Then, the exercise data acquisition unit 211 acquires exercise data from the data transmitter 100 via the communication device 231 (step S107). The characteristic point detector 212 uses exercise data acquired by the exercise data acquisition unit 211 and model data stored in the model DB 221 to detect a characteristic point of the exercise by the user and calculates a score of the characteristic point (step S108). These processings are the same as those in step S101 and step S102.

Next, the controller 210 determines whether the score calculated in step S108 is improved in comparison with the original score (the score calculated in step S102) (step S109) concerning the characteristic point of interest selected in step S103. Even in a case where a characteristic point of interest is not detected as a characteristic point in step S108, determination in step S109 is Yes (improved) provided that the score is improved.

In a case where a score is improved (step S109: Yes), control returns to S103. In a case where a score is not improved (step S109: No), the controller 210 increments the value of a variable i by 1 (step S110).

Then, the controller 210 determines whether the value of the variable i is greater than the number of causes for the characteristic point of interest (step S111). When the value of the variable i is greater than the number of causes for the characteristic point of interest (step S111: Yes), it follows that an animation to clearly present each of the causes for the characteristic point of view was displayed in step S106, so that control returns to step S104, and the controller 210 starts with the first cause.

In a case where the value of the variable i is equal to or smaller than the number of causes for the characteristic point of interest (step S111: No), control returns to step S105, and the controller 210 acquires a next cause and displays an animation that clearly presents the cause in step S106.

Figure 4A:
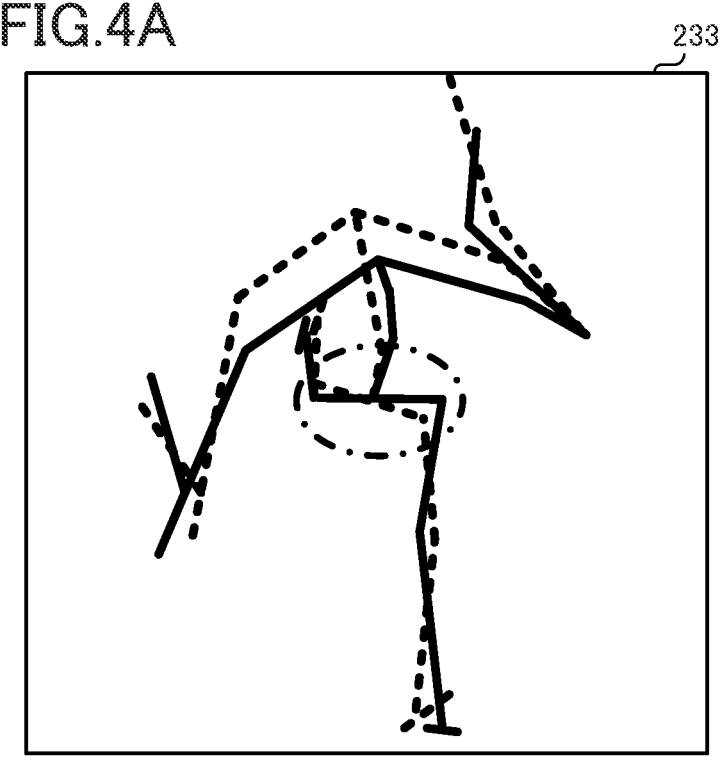
FIG. 4A explains an example of the animation of waist rotation viewed from right above.
Figure 4A:
Figure 4B:
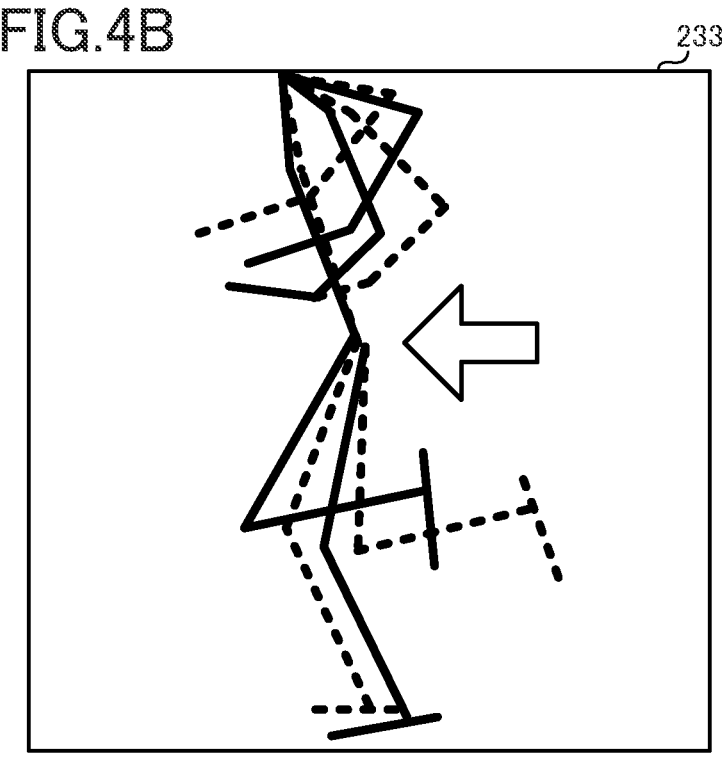
FIG. 4B explains an example of an animation of a relation between a waist and a pivot foot viewed from right beside.

For example, in a case where a first cause acquired by the cause acquisition unit 213 for a characteristic point "the strides are too short for a target speed" detected by the characteristic point detector 212 is "horizontal waist rotation is small", the animation preparing unit 214 prepares an animation of waist rotation viewed from right above (in a first direction of line of sight) and displays the resulting animation as illustrated in FIG. 4A. In a case where a score is not improved, the cause acquisition unit 213 acquires a second cause in step S105. For example, in a case where the second cause is "the motion of the waist is not properly supported by the pivot foot", in step S106, the animation preparing unit 214 prepares a user animation (a second user animation) in solid lines of a positional relation between a waist and a pivot foot viewed from right beside (in a second direction of line of sight) and a model animation in dotted lines, and displays both animations on the output device 233, as illustrated in FIG. 4B.

It may be displayed clearly for easy understanding of a user that the motion of the waist is not properly supported by the pivot foot, by presenting a related animation represented in a direction of line of sight from right beside. Moreover, FIG. 4B displays a large arrow at a waist portion to emphasize a relation between the waist and a pivot foot, thereby clearly presenting a cause for the characteristic point to the user.

The animation preparing processing has been described above. In a case where a user's characteristic point in an exercise has a plurality of causes, the animation preparing processing displays an animation concerning each cause that is easily understood by a user. This allows the animation preparing device 200 to clearly present an improvement point or the like in an exercise.

Variants of Embodiment 1

In Embodiment 1 described above, in a case where a user's characteristic point in an exercise has a plurality of causes, an animation concerning each cause viewed in a direction of a line of sight that will help understand the cause easily. There may be a case where there exists a plurality of directions of line of sight, concerning a single cause, that will help understand the cause easily. A variant to accommodate for this case will be described below.

Figure 5:
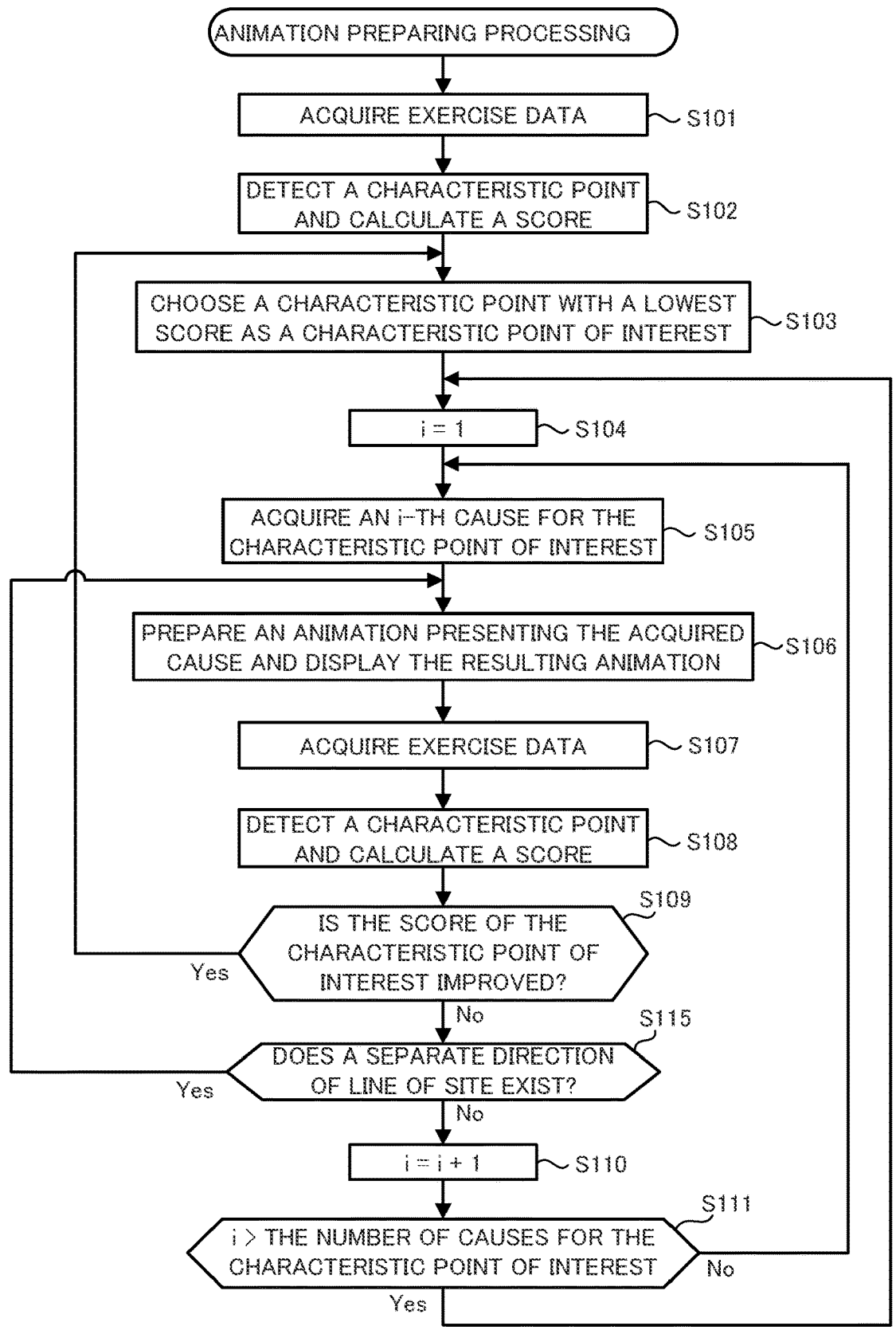
FIG. 5 is a flowchart of animation preparing processing according to a variant of Embodiment 1.

Functional configuration of the variant of Embodiment 1 is similar to that of Embodiment 1, and is as illustrated in FIG. 1. Animation preparing processing according to the variant of Embodiment 1 includes, as illustrated in FIG. 5, an additional step S115 between the step S109 and step S110 of the animation preparing step according to Embodiment 1.

In step S115, the controller 210 determines whether there exists a direction of line of sight (a third direction of line of sight) that is separate from the direction of line of sight assumed when an animation was prepared in step S106 (the first direction of line of sight), as a direction of line of sight that will help understand the i-th cause easily. In a case where a separate direction of line of sight (the third direction of line of sight) does not exist (step S115: No), control proceeds to step S110.

In a case where a separate direction of line of sight (the third direction of line of sight) exists (step S115: Yes), control returns to step S106 and the animation preparing unit 214 prepares an animation viewed in the separate direction of line of sight (the third direction of line of sight) (that will clearly present the i-th cause), and displays the resulting animation on the output device 233.

For example, assume that the characteristic point detector 212 chooses a characteristic point "Arm swing is poor" as a characteristic point of interest in step S103 and that a first cause acquired by the cause acquisition unit 213 for this characteristic point of interest in step S105 is "Arm swing is small". A case will be described where two directions of line of sight, that is, a direction of line of sight from right beside and a direction of line of sight from right above exist, as a direction of line of sight that will clearly present the cause.

Figure 6A:
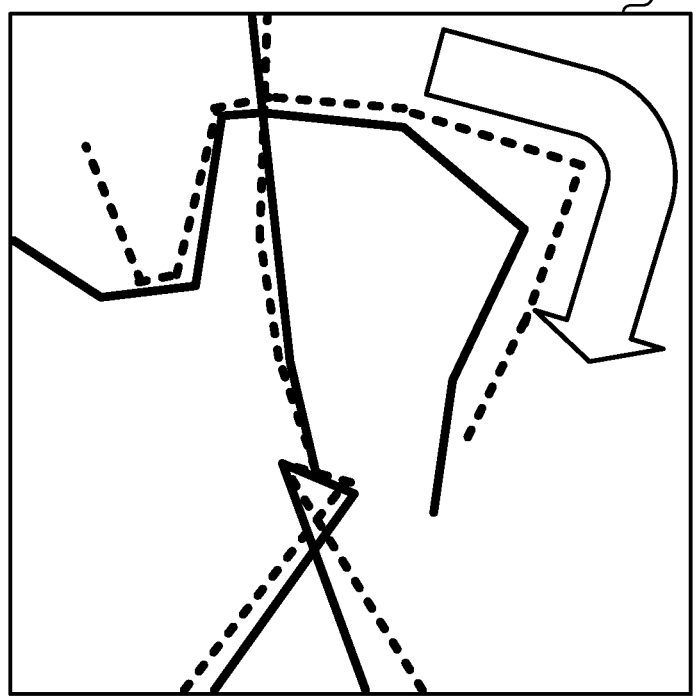
FIG. 6A explains an example of an animation of arm swing viewed from right beside.
Figure 6A:

First, in step S106, the animation preparing unit 214 prepares a user animation of an arm swing viewed from right beside (in a first direction of line of sight) (a first user animation) and a model animation, and displays both animations on the output device 233, as illustrated in FIG. 6A. Further in FIG. 6A, a large bending arrow is displayed at an elbow part to emphasize that the arm has not completely gone back.

Figure 6B:
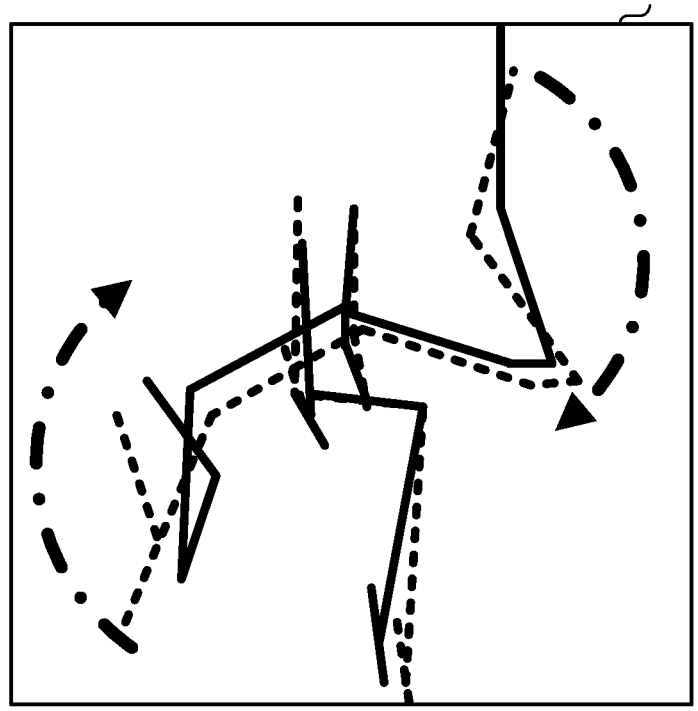
FIG. 6B explains an example of an animation of arm swing viewed from right above.

Similarly, the controller 210, after presenting an animation in step S106, waits for a certain period of time. The exercise data acquisition unit 211 acquires exercise data via the communication device 231 in step S107 and re-calculates a score in step S108. In a case where a score is not improved in step S109, the animation preparing unit 214 prepares, in a second step S106, a user animation (a third user animation) of an arm swing in solid lines viewed from right above (in a third direction of line of sight) and a model animation in dotted lines, and displays both animations on the output device 233, as illustrated in FIG. 6B. Further in FIG. 6B, an arrow in dashed curve is displayed around the left and right arms to emphasize that it is necessary to swing the arms harder.

In this way, in the variants of Embodiment 1, it is possible to prepare an animation in each direction of line of sight for the same cause and display the resulting animations thereby communicating the cause to a user in a simpler way.

Embodiment 2

In Embodiment 1, a so-called online use is assumed where a user carries the animation preparing device 200 to a place of exercise and repeats a sequence of checking an animation prepared on site and doing an exercise. Another option may be a so-called offline use where, for example, a user carries a data transmitter 100 alone to a place of exercise and, on returning home, the user checks an animation that has been prepared. Embodiment 2 that corresponds such an offline use will be described.

Figure 7:
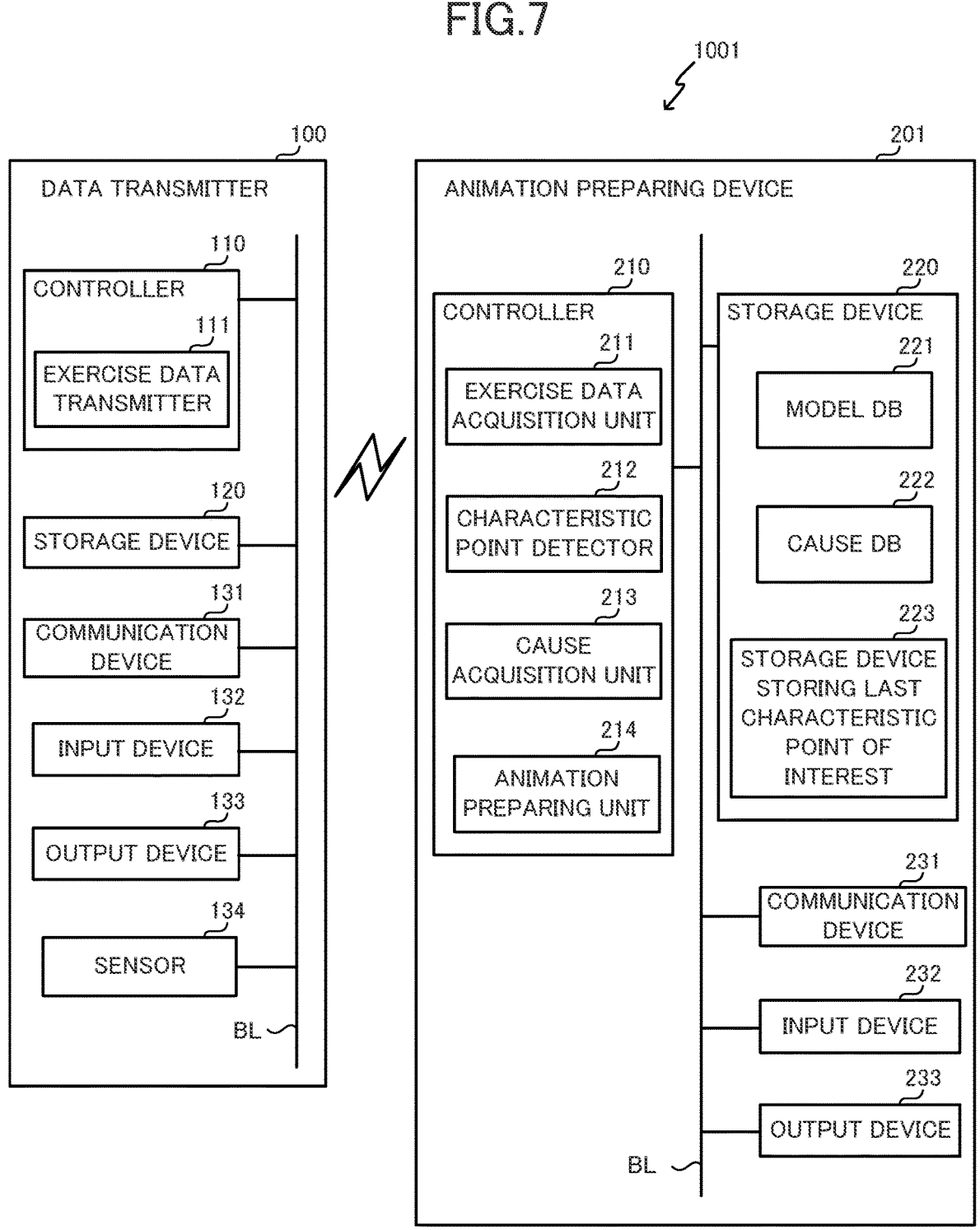
FIG. 7 illustrates a configuration example of an animation preparing system according to Embodiment 2.

An animation preparing system 1001 according to Embodiment 2 differs from Embodiment 1 in that a storage device 220 in an animation preparing device 201 includes a storage device storing last characteristic point of interest 223, as illustrated in FIG. 7.

The storage device storing last characteristic point of interest 223 stores a characteristic point of interest chosen last time (when an animation was last prepared) and its score. The data is stored in a nonvolatile memory such as a flash memory.

Except for the above, the animation preparing system 1001 has the same configuration as the animation preparing system 1000 according to Embodiment 1, so that the corresponding description is omitted.

Figure 8:
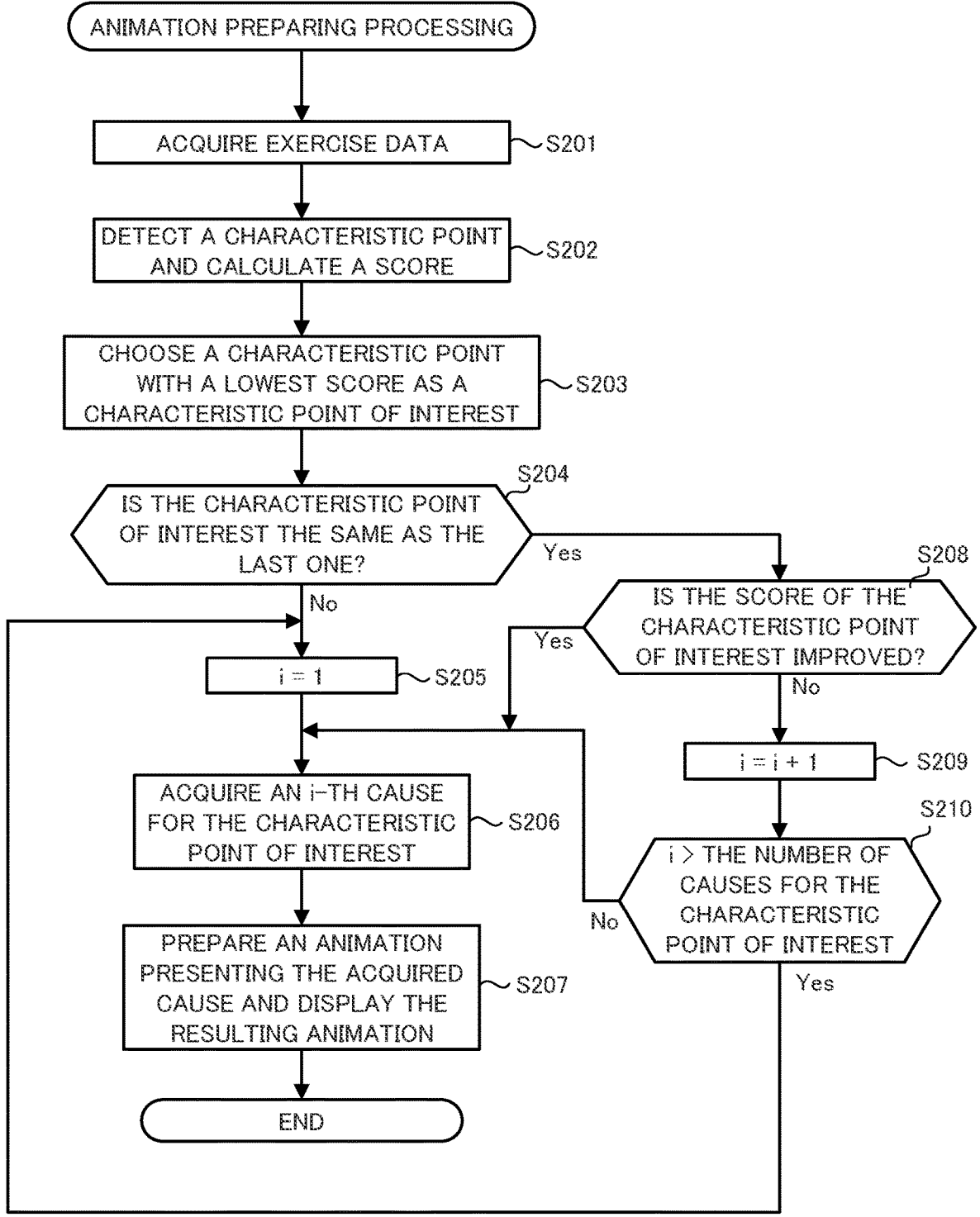
FIG. 8 is a flowchart of animation preparing processing according to Embodiment 2.

Next, animation preparing processing executed by the animation preparing device 201 will be described with reference to FIG. 8. This processing starts to be executed, as in Embodiment 1, upon an input of an instruction "Prepare animation" by a user via an input device 232.

Processing from step S201 to step S203 is similar to the processing from step S101 to step S103 of the animation preparing processing according to Embodiment 1, so that the corresponding description is omitted.

In step S204, a controller 210 determines whether a characteristic point of interest chosen in step S203 is the same as the characteristic point of interest stored in the storage device storing last characteristic point of interest 223. In a case where the characteristic point of interest differs from one chosen last time (step S204: No), control proceeds to step S205. Processing from step S205 to step S207 is similar to the processing from step S104 to step S106 of the animation preparing processing according to Embodiment 1, so that the corresponding description is omitted. When an animation is prepared and displayed in step S207, the animation preparing processing is finished.

On the other hand, in a case where the characteristic point of interest is the same as from one chosen last time (step S204: Yes), the controller 210 determines whether the score calculated for the characteristic point of interest in step S202 is improved in comparison with the last score stored in the storage device storing last characteristic point of interest 223 (step S208).

In a case where the score is improved (step S208: Yes), it follows that the score is improved by way of an animation presented last time. Thus, control proceeds to step S206 in order to present the same animation. In a case where the score is not improved (step S208: No), the controller 210 increments the value of a variable i by 1 (step S209). In the animation preparing device 201, the variable i is stored in a nonvolatile memory as in the storage device storing last characteristic point of interest 223 and the value of the variable i assumed when the last animation was prepared is maintained.

The controller 210 determines whether the value of the variable i is greater than the number of causes for the characteristic point of interest (step S210). When the value of the variable i is greater than the number of causes for the characteristic point of interest (step S210: Yes), it follows that an animation to clearly present each of the causes for the characteristic point of view was displayed in step S207, so that control returns to step S205, and the controller 210 acquires a first cause and displays an animation to clearly present the cause.

In a case where the value of the variable i is equal to or smaller than the number of causes for the characteristic point of interest (step S210: No), control returns to step S206, and the cause acquisition unit 213 acquires a next cause and displays an animation that clearly presents the cause in step S207 to finish the animation preparing processing.

As described above, the animation preparing processing according to Embodiment 2 stores the last characteristic point of interest in the storage device storing last characteristic point of interest 223 in the animation preparing device 201, so that it is possible for a user to do an exercise such as running while carrying the data transmitter 100 alone. On returning home, the user transmits exercise data stored in a storage device 120 of the data transmitter 100 to the animation preparing device 201 via a communication device 131. Then, the animation preparing device 201 may compare a score of the last characteristic point of interest stored in the storage device storing last characteristic point of interest 223 with a score calculated based on the current exercise data acquired via a communication device 231, and present an animation concerning a cause for the characteristic point viewed in a direction of a line of sight that will help understand the cause easily.

Variants of Embodiment 2

In a case where there exists a plurality of directions of line of sight, concerning a single cause, that will help understand the cause easily, as in the variant of Embodiment 1, it is possible to configure a variant that prepares animations to sequentially present the plurality of directions of line of sight. To this end, processing similar to step S115 in the variant of Embodiment 1 may be added between step S208 and step S209 of the animation preparing processing (FIG. 8). The processing in step S115 is processing where the controller 210 determines whether there exists a line of sight that is separate from the line of sight assumed when an animation was prepared in step S207, as a direction of line of sight of an animation that will help understand the i-th cause easily.

In a case where a separate direction of line of sight does not exist, control proceeds to step S209. In a case where a separate direction of line of sight exists, control proceeds to step S207. An animation preparing unit 214 prepares an animation viewed in the separate direction of line of sight (an animation that clearly presents the i-th cause) and displays the resulting animation to an output device 233. In which direction of line of sight an animation has been prepared may be stored in a nonvolatile memory of the storage device 220, as in the storage device storing last characteristic point of interest 223.

Such processing makes it possible to prepare an animation from a plurality of directions of line of sight concerning the same cause and display the resulting animation even in an online use, thereby displaying an easy-to-understand animation to the user.

The present disclosure is not limited to the foregoing embodiments but can be modified in a variety of ways. For example, the data transmitter 100 is a device specifically designed to transmit exercise data in the foregoing embodiments. A data transmitter may, however, be configured to capture the configuration of an animation preparing device 200, 201 and prepare an animation, and then transmit the data of the prepared animation to other devices such as a PC, a tablet, a smartphone and a smart watch. In this case, the user can view the animation prepared by the data transmitted on one of the other devices without using a special device such as the animation preparing device 200, 201.

The animation preparing device 200, 201 may include a sensor 134. This configuration allows the animation preparing device 200, 201 alone to prepare a user animation without using the data transmitter 100.

The functions of the animation preparing device 200, 201 may be provided by a computer such as an ordinary PC. To be specific, in the foregoing embodiments, a program for animation preparing processing executed by the animation preparing device 200, 201 is stored in the ROM of the storage device 220. It is also possible to configure a computer that offers the aforementioned functions by storing such a program on a computer-readable recording medium such as a flexible disc, a compact disc read only memory (CD-ROM), a digital versatile disc (DVD), a magneto-optical disc (MO), a memory card or a universal serial bus (USB) memory, distributing one or more of the recording media, and then loading and installing the program in a computer.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An animation preparing device comprising at least one processor, wherein the processor is configured to:
   acquire exercise data concerning an exercise done by a user or the exercise that the user is doing;
   detect, based on the exercise data, a characteristic point of the exercise by the user;
   acquire, from a memory, a first cause for the characteristic point;
   prepare, from the exercise data, a first user animation represented in a first direction of line of sight as an animation of the exercise done by the user or the exercise that the user is doing in order to indicate the first cause for the characteristic point, and output the first user animation to a display;
   after having output the first user animation to the display, acquire new exercise data concerning the exercise done by the user or the exercise that the user is doing;
   detect, based on the new exercise data, a characteristic point of the exercise performed by the user and that corresponds to the characteristic point detected based on the previously acquired exercise data;
   determine whether the characteristic point detected based on the new exercise data has improved compared to the characteristic point detected based on the previously acquired exercise data;
   acquire from the memory, based on a result of the determination, a second cause for the characteristic point that is separate from the first cause; and
   prepare, from the new exercise data, a second user animation that is separate from the first user animation represented in the first direction of line of sight, the second user animation being represented in a second direction of line of sight as an animation of the exercise done by the user or the exercise that the user is doing, in order to indicate the second cause for the characteristic point that is separate from the first cause, and output the second user animation to the display.

2. The animation preparing device according to claim 1, further comprising the display.

3. The animation preparing device according to claim 1, wherein the processor prepares a model animation from model data as model data of the exercise and displays the first and second user animation and the model animation on the display.

4. The animation preparing device according to claim 1, wherein the processor applies an indication to specify the first cause on the first user animation and displays the resulting first user animation on the display, and applies an indication to specify the second cause on the second user animation and displays the resulting second user animation on the display.

5. The animation preparing device according to claim 1, wherein the processor acquires the first cause and the second cause for the characteristic point based on the acquired exercise data and model data as a model of the exercise.

6. The animation preparing device according to claim 5, wherein the processor acquires the first cause and the second cause for the characteristic point based on a difference between the exercise data and the model data.

7. The animation preparing device according to claim 1, wherein
the first direction of line of sight is a direction in which the first cause is visually recognizable, and
the second direction of line of sight is a direction in which the second cause is visually recognizable.

8. The animation preparing device according to claim 7, wherein in a case where there exists, as a direction in which the first cause is visually recognizable, a third direction of line of sight that is separate from the first direction of line of sight, the processor prepares, from the exercise data, a third user animation that is separate from the first user animation and is an animation of the exercise done by the user or the exercise that the user is doing, the third user animation being represented in the third direction of line of sight, in order to indicate the first cause for the characteristic point.

9. An animation preparing method executed by an information processing device, the method comprising:
acquiring exercise data concerning an exercise done by a user or the exercise that the user is doing;
detecting, based on the exercise data, a characteristic point of the exercise by the user;
acquiring, from a memory, a first cause for the characteristic point;
preparing, from the exercise data, a first user animation represented in a first direction of line of sight as an animation of the exercise done by the user or the exercise that the user is doing in order to indicate the first cause for the characteristic point, and outputting the first user animation to a display;
after having output the first user animation to the display, acquiring new exercise data concerning the exercise done by the user or the exercise that the user is doing;
detecting, based on the new exercise data, a characteristic point of the exercise performed by the user and that corresponds to the characteristic point detected based on the previously acquired exercise data;
determining whether the characteristic point detected based on the new exercise data has improved compared to the characteristic point detected based on the previously acquired exercise data;
acquiring from the memory, based on a result of the determination, a second cause for the characteristic point that is separate from the first cause; and
preparing, from the new exercise data, a second user animation that is separate from the first user animation represented in the first direction of line of sight, the second user animation being represented in a second direction of line of sight as an animation of the exercise done by the user or the exercise that the user is doing, in order to indicate the second cause for the characteristic point that is separate from the first cause, and outputting the second user animation to the display.

10. The animation preparing method according to claim 9, further comprising preparing a model animation from model data as model data of the exercise and displaying the first and second user animation and the model animation on the display.

11. The animation preparing method according to claim 9, wherein the first cause and the second cause for the characteristic point are acquired based on the acquired exercise data and model data as a model of the exercise.

12. A non-transitory computer-readable recording medium storing a program executable by a processor of an animation preparing device, wherein the program causes the processor to:
acquire exercise data concerning an exercise done by a user or the exercise that the user is doing;
detect, based on the exercise data, a characteristic point of the exercise by the user;
acquire, from a memory, a first cause for the characteristic point;
prepare, from the exercise data, a first user animation represented in a first direction of line of sight as an animation of the exercise done by the user or the exercise that the user is doing in order to indicate the first cause for the characteristic point, and output the first user animation to a display;
after having output the first user animation to the display, acquire new exercise data concerning the exercise done by the user or the exercise that the user is doing;
detect, based on the new exercise data, a characteristic point of the exercise performed by the user and that corresponds to the characteristic point detected based on the previously acquired exercise data;
determine whether the characteristic point detected based on the new exercise data has improved compared to the characteristic point detected based on the previously acquired exercise data;
acquire from the memory, based on a result of the determination, a second cause for the characteristic point that is separate from the first cause; and
prepare, from the new exercise data, a second user animation that is separate from the first user animation represented in the first direction of line of sight, the second user animation being represented in a second direction of line of sight as an animation of the exercise done by the user or the exercise that the user is doing, in order to indicate the second cause for the characteristic point that is separate from the first cause, and output the second user animation to the display.

13. The non-transitory computer-readable recording medium according to claim 12, wherein the program further causes the processor to prepare a model animation from model data as model data of the exercise and displays the first and second user animation and the model animation on the display.

14. The non-transitory computer-readable recording medium according to claim 12, wherein the program further causes the processor to acquire the first cause and the second cause for the characteristic point based on the acquired exercise data and model data as a model of the exercise.

* * * * *